Dec. 10, 1968 K. S. ETTRE 3,415,706

MACHINES FOR TAPE TRANSFER

Filed June 16, 1965 2 Sheets-Sheet 1

INVENTOR.
KITTY S. ETTRE
BY Kitty S. Ettre

INVENTOR.
KITTY S. ETTRE
BY Kitty S. Ettre

United States Patent Office 3,415,706
Patented Dec. 10, 1968

3,415,706

MACHINES FOR TAPE TRANSFER

Kitty S. Ettre, Stamford, Conn., assignor to Vitta Corporation, Wilton, Conn.

Continuation-in-part of application Ser. No. 377,998, June 25, 1964. This application June 16, 1965, Ser. No. 464,524
1 Claim. (Cl. 156—540)

ABSTRACT OF THE DISCLOSURE

The invention is concerned with an automatic machine for continuously processing the coating of at least one side surface of a strip of material with coating material carried by a transfer tape of the four-layer type consisting of a first carrier layer, a second transfer coating material containing layer, a third adhesive layer, and a fourth protective layer covering the adhesive layer, and contemplates the provision of means to bring the strip and transfer tape from rolls thereof into juxtaposition for pressure bonding the coating material carried by the transfer tape to the surface of the strip, and further contemplates means to remove the protective layer of the four-layer type transfer tape from its covering relation with the adhesive layer simultaneously with the drawing of the tape from the tape roll, whereby as the tape is brought into juxtaposition with the strip the adhesive layer is exposed and brought into direct contact with the strip. Following such juxtaposition, the strip and the three-layer remainder tape are drawn between a pair of opposed spaced pressure rollers, one in contact with the strip, and the other in contact with the carrier layer of the tape, to thus pressure bond the coating material to the surface of the strip. Following the bonding of the coating layer to the strip by the pressure rollers, means are provided for releasing the carrier layer of the tape from the coated strip in the transport of the coated strip to strip take-up reel means and of the carrier layer of the tape to tape take-up reel means.

This invention is a continuation in part of the invention disclosed in an application, Ser. No. 422,135, filed Dec. 30, 1964 and an application Ser. No. 377,998, filed June 25, 1964, now Patent No. 3,371,001.

This invention relates to a machine and machine process to apply transferable tape more particularly to machines suitable for applying transferable tapes to strips or to ribbons of metallic or non-metallic materials.

Tape transfer is a dry method to produce thin and extremely accurate layers of coatings of various materials on entire surfaces or in patterns. The tape transfer method in producing thin and accurate layers is known to be performed by hand application. Mechanization of the process was not solved yet but would be highly desirable to adopt this very accurate and versatile method to mass production. Such tape transfer machines would have the advantage that the tape transfer to produce coated areas could be performed instead of the presently used hand application by a machine. Such a machine, a machine for tape transfer, would increase production speed as compared to manual operation, reduce production costs, make the process more uniform and enable the transfer of the tape to both sides of an object to be coated simultaneously.

Previously so-called "wet" techniques such as painting, spraying or silk screening were utilized to apply thin layers of materials on a piece to be coated. These methods were used in applying metalizing layers on ceramics or other dielectrics or to produce glazed or enameled metal or ceramic surfaces. These techniques differ only in the method of application of the e.g. metalizing or glazing material; however, the basic idea is similar because in all cases a fluid mixture is utilized. The mechanization of these methods especially to produce an extremely uniform layer is very difficult due to the inherited difficulties in the accurate application of a liquid to a solid surface. Other problems, such as variations in thickness or density of the applied coating and, for example, the "curling" effect on the edges of flat surfaces or flowing on rounded surfaces due to the effect of surface tension, makes the liquid methods in cases unuseful for production or automation.

With the introduction of the tape transfer technique, a novel and "dry" method was invented to produce thin layers of various materials on the parts to be coated. The production of transferable tapes and the tape transfer method to produce metalized, glazed, glass or insulator surfaces is considered here per se known and was described for example in a copending application Ser. No. 377,998 by the same inventor and filed on June 25, 1964.

In the thin film deposition method known as tape transfer techniques, the layers such as metalizing, glazing, insulating or resistive layers are prefabricated in a dry form as a tape on a carrier layer and are transferred from this carrier to the surface to be coated with help of a suitable agent. This agent could be an adhesive. The most important feature of this method is that it eliminates the use of the uncontrollable liquid suspensions. With this new technique, the thickness and density of the produced layer can be controlled very closely, accurate placement of the layer is achieved and all problems described in connection with the liquid type application techniques are eliminated.

The methods of the production of the transferable tapes are considered per se known and not claimed in this invention. These transferable tapes are usually composed of the following layers: (a) a carrier layer on which a heavily loaded layer (b) is removably attached. This heavily loaded layer contains the mixture of specific material, for example, a glass frit, metalizing metals, or ceramic insulator powders or a mixture of them with suitable binders and plasticizer which organics may or may not burn out, depending on the type of application of the tape. This removably attached layer is coated with an adhesive layer and finally the adhesive coated tape is covered with a protective paper which is easily removed. Several combinations of this layer can be envisioned and it is also possible that this layer is not obtained in the above form but they have to be laminated prior to their application to the parts to be coated. The general principle, however, is that the transferable tape consists of a carrier and a transferable layer removably attached thereto and that this removably attached layer is made pressure sensitive. This means that if parts are placed on it and suitable pressure is applied to them, they adhere to the tape. If the pressure was properly applied, the parts are picked up by hand from the tape; the tape removably attached to the carrier will now adhere to the parts where it contacted the tape and will stay on the carrier where it was not contacted. This hand operation, however, is sufficient only for small production but is inadequate for large quantity operations.

Moreover, the prior art utilized hand application of the tape transfer to the materials to be coated. Such application method was, e.g., to utilize an arbor press. The transferable tape was laid in this method on the table of the arbor press having its removably attached layer facing upward. The parts or strips to be coated were laid on this transferable tape and the pressure was applied. After the proper pressure was applied and the upper plate of the press was elevated, the ready coated parts were released by simply picking them up from the transfer tape by hand. This hand application is slow and is not applicable to mass production.

Another disadvantage of the hand application is that the application of pressure and especially the release from the tape is not uniform and hence variation in the pressure and release may result in poor transfer of the tape.

In general this invention is a continuation in part of the invention disclosed in an application, Ser. No. 422,135 filed Dec. 30, 1964.

The object of this continuation in part of the original invention is to provide a machine wherein strips or ribbons of metallic, non-metallic plastic materials are continuously coated with selected transfer tapes utilizing the transfer tape process.

Another object of this invention is to provide mechanized process to produce uniform layers on strips or ribbons.

A further object of this invention is to assure accurate placement and transfer of the tape to the desired surfaces on strips or ribbons.

Another object of this invention is to provide a mechanized process whereby both sides of an object can be coated simultaneously.

A further object of this invention is to provide a mechanized process whereby strips of irregular shapes can be coated.

A further object of this invention is to provide high speed automatic process of coating strips or ribbons utilizing tape transfer technique.

Other objects of the invention will become apparent after reading the following specification when taken in conjunction with the accompanying drawings.

According to this invention ribbons and strips of metallic or nonmetallic materials such as Kovar, copper, nickel, or nonmetallic such as polyethylene, polypropylene or thin flexible glass can be coated with transferable tapes such as glazing, conductive silver or resistive carbon transferable tapes. The transfer of this uniform coating according to this invention is highly automated and the combination of steps of the machine tape transfer process are: (a) loading step which takes place in the loading zone; (b) pressure application which is applied in the process zone, (c) release step performed in the release zone.

The machine process we describe below in connection with the drawings takes advantage of the transferable properties of the transfer tape and combines it with a continuous operation: utilizing a combination of a loading mechanism having tape and strip guides, parallel acting pressure rollers, and a release mechanism. In certain cases the loading zone and the release mechanism can be eliminated if the curvature of the pressure rollers are such that by bending the tape around them, a perfect loading and release takes place. The invention the automatic tape transfer machine and the automatic tape transfer to strips and ribbons will be hereinafter explained in greater detail in reference to the accompanying drawings.

Figure 1:
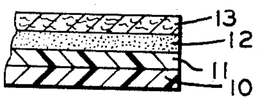
FIGURE 1 is a schematic representation of the cross section of a transfer tape.

Referring to FIGURE 1 a transfer tape is shown in which a carrier film 10 such as polyethylene, paper or Mylar on which a transferable tape 11 such as glass transfer tape, metalizing transfer tape or resistive transfer tape is formed to be removably attached to said carrier film. An adhesive film 12 is shown to be spread on the transferable tape to facilitate its transfer and finally a protective paper 13 is removably attached to the adhesive coated transfer tape for its protection. This is only one embodiment of the transfer tapes known from prior art and the automatic tape transfer machine is able to handle other embodiments of the transfer tapes and it is to be understood that the invention of the machine and process of automatic tape transfer explained in greater detail in the following figures is not limited to said details of the transfer tape shown in FIGURE 1.

Figure 2:
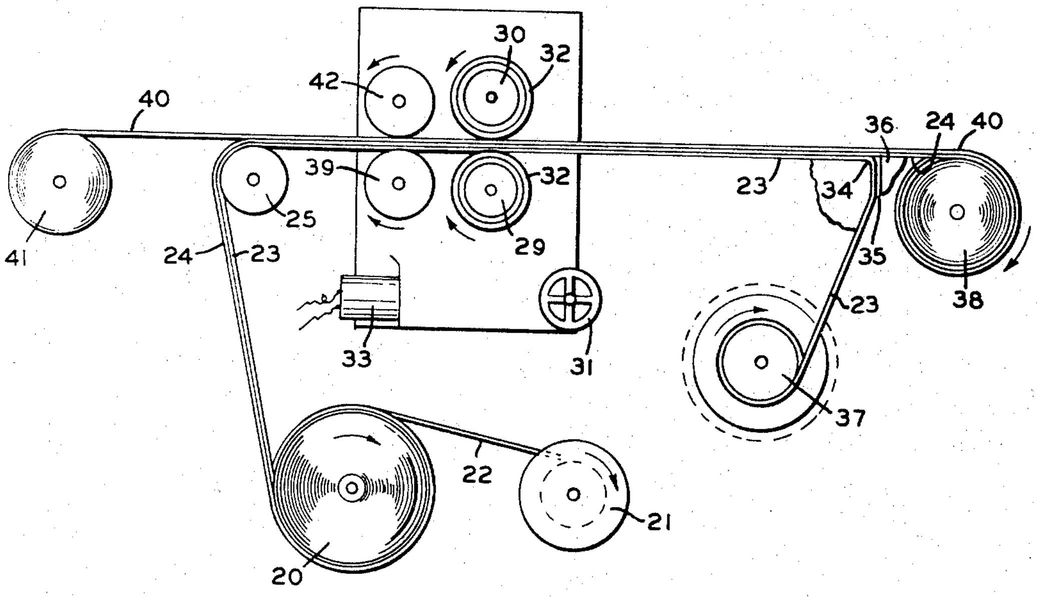
FIGURE 2 is a schematic of a tape transfer machine for one side coating of strips or ribbons.

Referring to FIGURE 2 the function of the machine can be described as follows: The transfer tape comprising, e.g., the carrier film, the removably attached transferable film coated with an adhesive and the protective paper is mounted on a reel 20. There is another reel 21 provided to wind up the protective paper 22 removably attached to the transfer tape. The transfer tape comprising now of the carrier 23 and the transferable tape with its adhesive coating 24 is then lead over a guiding roller 25 onto the loading mechanism. The loading mechanism has a tape guide reel 39 said adjustable tape guide reel places the tape exactly in the track to be placed accurately opposite the strip or ribbon 40 to be coated. However, excellent results can be obtained with having only one tape guide reel as shown in the figure, in certain cases, however, if more accurate placing is necessary, more than one parallel acting guiding reels could also be utilized. The strip or ribbon 40 to be coated, by means of a transferable tape is continuously fed from a reel, 41 and if the strip or ribbon is fairly rigid such as a Kovar or plastic strip it can be directly fed into the loading mechanism. If the ribbon or strip is fragile, then supporting means can be used between the feeding tool and the loading mechanism. The strip or ribbon unwinding from the reel 41 is fed into the loading mechanism into a strip guiding reel 42. The strip guiding reel 42 places the strip in a position that it should accurately be placed over the transfer tape guided by its guiding reel 39. This loading mechanism in this embodiment provides that the transferable tape and the strip to be coated proceed to obtain an accurate placement in relation to each other. The transfer tape 23, 24 is pressed to the strip or ribbon 40, when it passes through the pressure rollers 29, 30 the gap between the lower pressure rollers 29, and upper pressure roller 30 can be adjusted by a gap adjustor 31, so that it should accommodate various thickness of the trannsferable tape and also of strip or ribbon materials. The material of the pressure rollers may be varied according to the nature of the strip or ribbon to be coated and also according to their shape. I found that rollers can be made of stainless steel, aluminum or a metal coated with plastic, rubber or ceramic layers. The rollers 29, 30 shown in FIGURE 2 are of stainless steel coated with a hard rubber layer 32 suitable for transferring tape to plastic strips or ribbons. One or both of the rollers may be driven by a motor drive 33 which motor is also used to drive reels such as the transfer tape reel 20 and also the other reels 21, 41, 37, 38, 39, 40 utilized in the machine. The strip or ribbon 40 to be coated passing through the pressure rollers 29, 30 is now attached to the transfer tape 23, 24. The pressure exerted by the pressure rollers is selected by adjusting the gap adjuster 31 to obtain optimum tape transfer. The strip or ribbon 40 because of the pressure applied between rollers 29, 30 is strongly adhering to the adhesive side of the transfer tape and proceed together with the transfer tape 23, 24 to a release mechanism. The release mechanism in this embodiment is suitably made from metal having sharp corner 34. The transfer tape guided over this metal edge 34 of the release mechanism, is attached to the rewind reel 37. In operation the rewind reel 37 pulls the transfer tape 23, 24 under tension over the release edge 34. The strip or ribbon 40 firmly pressed onto the transfer tape 23, 24 is however continuing to proceed straight over the second release edge 36 after riding over the release gap 35. The carrier which is now separated from the transferable tape continues into the gap 35 and is wound on the carrier rewind reel 37. The release mechanism can be made of rollers instead of the stationary metal parts having sharp edges and in certain cases it can be visualized that the pressure roller can serve as releasing mechanism if the pressure rollers dimension are allowing it. It is permissible to use a reel 38 unwinding the coated strip or ribbon. The reels such as tape reel 20, paper winder reel 21, carrier winder reel 37 are driven or pulled in conventional means not shown in this figure connected to drive means, 33 to assure a continuous movement of the transfer tape. It is also possible that the same drive means 33 is used for driving the strip holding reel 41 and also driving reel 38 to insure continuous operation. The release mechanism or at least one of its members such as the first release edge 34 may be also vibrated to facilitate the release but in most cases it was found that vibration of the release mechanism is not necessary to obtain an excellent release. It is evident from this drawing that a novel machine was invented which attempts coating of strips or ribbons by the tape transfer technique and is combining the steps of loading, pressure application by two rollers and finally the release utilizing a sharp edge and the narrow gap in one single operation which may be carried out continuously.

Figure 3:
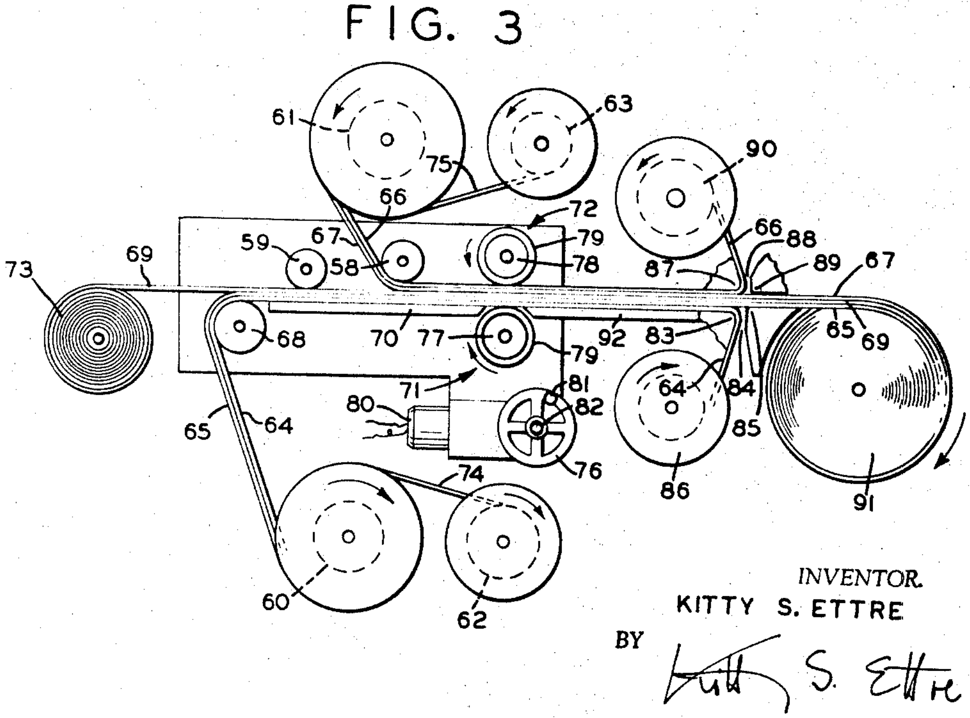
FIGURE 3 is a schematic of a tape transfer machine for coating both sides of a strip or ribbon simultaneously.

FIGURE 3 shows the schematic of an automatic tape transfer machine which produces strips coated on both sides simultaneously. In this embodiment, the lower reel 60 and the upper reel 61 contain the transfer tape. The protective paper 74 and 75 respectively were released from the transfer tape are wound up by means of the lower protective paper winder 62 and upper paper winder 63. The other layers of the transfer tape 64, 65 for coating the bottom of the strip or ribbon to be coated is led around the aligning reel 68 of the loading zone. The strip or ribbon 69 to be coated is fed from a strip holding reel 73 into the loading mechanism into the strip aligning reel 59. The transfer tape 66, 67 to be utilized to coat the upper surface of the strip is loaded on reel 61. The protective paper 75 is wound up on reel 63. The carrier 66 and the transfer tape 67 removably attached to said carrier 66, is fed from its reel 61 into the loading mechanism into the upper transfer tape aligning reel 58. The loading zone in this embodiment also comprises a flat table 70 to lead the strip aligned with the upper and lower transferable tape 64, 65, 66 and 67 respectively, into the pressure rollers 71 and 72. Thus when the strip advances from loading zone into the pressure rollers 71, 72 the bottom of the strip is pressed on the lower transfer tape 64, 65 and the top of the strip is presed to the upper transfer tape 66, 67 coming in contact with their transferable tape sides 65 and 67 respectively. The gap between the two pressure rollers 71 and 72 can be adjusted by means of the pressure roll gap adjuster 76. The proper pressure roll gap is selected for each strip or ribbon 69 according to its thickness and material to insure the proper tape transfer. The material of the rollers 77, 78 shown in this embodiment, is stainless steel, having each a rubber surface coating 79. At least one roller is driven by a motor drive 80. The rollers are moving in the opposite direction to each other to advance the parts uniformly. The pressure roll gap adjuster 76 has a hand crank 81 and a dial indicator 82. The strip or ribbon 69 pressed uniformly between the lower and upper transfer tapes by the pressure rollers is then advancing sandwiched between the now adhering two transfer tapes to the release mechanism. The transfer tapes and because of the pressure of the rollers the now strongly adhering strips advancing now on a table 92 into the release mechanism. The release mechanism consists of lower release mechanism and the upper release mechanism. The lower release mechanism in this embodiment is mounted prior to the upper release mechanism. This, however, can be reversed or set at the same place. The lower release mechanism contains two edged material 83 and 85 separated by a gap 84. In operation the lower rewind reel 86 pulls the lower transfer tape 64, 65 with a slight tension over release edge 83, through gap 84. The strip or ribbon 69, firmly pressed onto the transfer tape 64, 65 and 66, 67 is continuing to proceed over the gap 84. The lower trnansferable tape adhering now strongly to the strip or ribbon, 69, is releasing from the carrier when pulled around a sharp release edge 83 and continuing over the release gap 84, adhering now firmly to the strip or ribbon to be coated. The strip or ribbon 69 coated on one side with the lower transferable tape 65 which is released from its carrier, 64 is still adhering to the upper transfer tape 66, 67 until it is pulled over upper first release edge 87. Here the upper carrier 66 pulled under slight tension through the upper release gap 88 by upper rewind reel 90. The strip or ribbon 69 coated on one side with lower transferable tape 65 and adhering now also to the upper transferable tape 67 which is released from its carrier 66 proceed forward over second release edge 89. The now both side coated strip or ribbon may be wound up by a strip winding reel 91.

Figure 4:
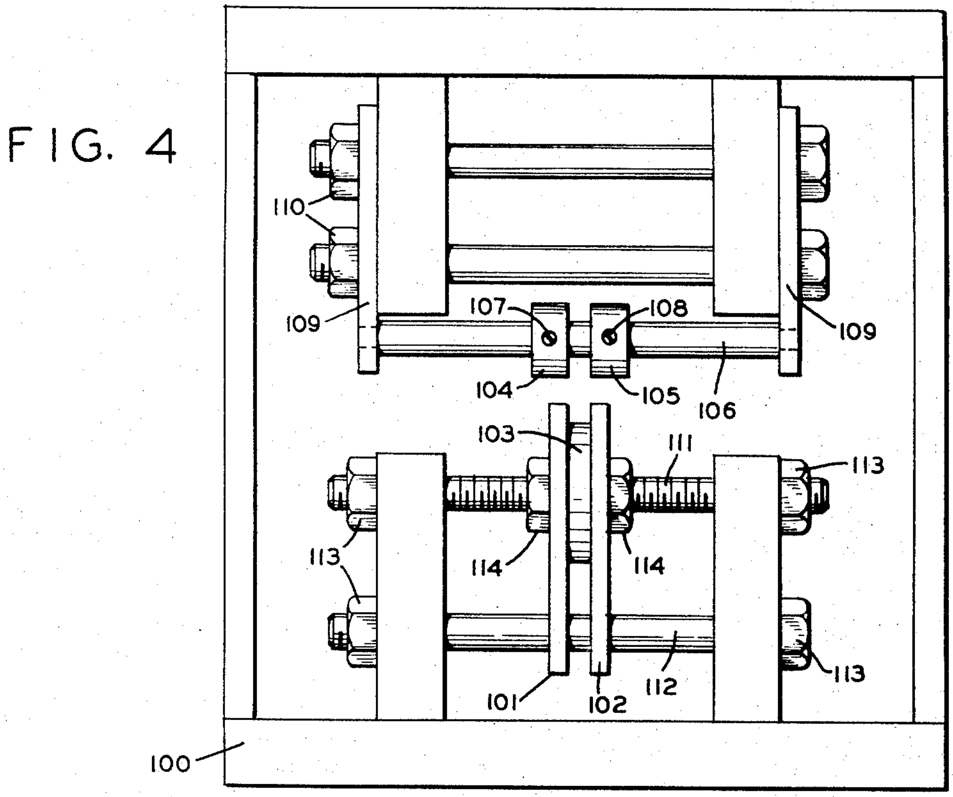
FIGURE 4 is a schematic of the loading mechanism with some parts omitted in the interest of clarity.
Figure 5:
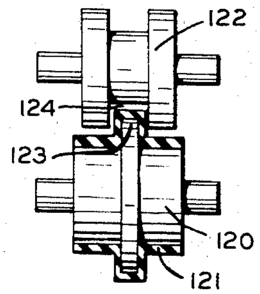
FIGURE 5 is a schematic of pressure rollers.

FIGURE 4 represents the schematic of the loading mechanism. This figure shows the loading mechanism utilized for loading transferable tape on one side of a strip or ribbon to be coated. This mechanism is shown mounted on a frame 100. This loading mechanism contains two side plates 101 and 102 having a tape guiding spacer 103 in between. Side plates may be the same for a number of transfer tape width, only the spacer 103 is changed for different tapes. The two alignment nuts 114 and threaded rod 111 are used to position the transfer tape guiding mechanism in line with the other parts of the machine. The straight rod 112 prevents the side plates from turning when the adjustment nuts 114 are tightened. The assembly and disassembly of this part of the machine is performed by means of the nuts 113. The strip is loaded on by a strip guide mechanism. This strip guide mechanism has two strip guides 104 and 105 the spacing of these strip guides 104, 105 can be selected by aligning the strip to its mating transferable tape and by securing the position of the strip guides 104, 105 mounted on an axis 106 by two set screws 107 and 108. The distance of the strip and the transferable tape can be adjusted by moving the holder 109 of the strip guiding means by adjusting screws 110. In order to accommodate bigger or different shape strips, proper shape strip aligning guides can be utilized. One embodiment of the pressure rollers which can be also utilized successfully is shown in FIGURE 5. In this embodiment, the pressure roller unit consists of a drive roller 120 and an idler roller 122. The idler roller has a recessed groove 124 and the drive roller has a tongue 123. The tongue and groove design provides for accurate alignments of the strip or ribbon and the transferable tape while pressure is being applied. The groove 124 in the idler roller 122 guides the strip and transferable tape while the drive roller 120 gives a uniform pressure and moves the strip and the transferable tape through the machine. In this embodiment the drive roller 120 is made of a metal such as stainless steel and its surface is covered with rubber 121. The idler roller is made of a metal such as stainless steel or aluminum. It is possible that these rollers are made of materials similar to the ones described in connection with FIGURES 2 and 3. In FIGURES 2 and 3 just plain cylindrical rollers were used and their material was described to vary according to its application. These rollers shown in FIGURE 5 can be interchangeable with the rollers utilized in connection with the machine shown in FIGURES 2 and 3. The shape of the roller is not limited to the design shown in FIGURES 2, 3 and 5, but can be different, according to the shape, material and nature of the strip or ribbon to be coated.

Figure 6:
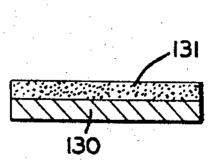
FIGURE 6 is a schematic of the cross section of a metal strip coated with a glazing transfer tape.

FIGURE 6 shows a schematic of the cross section of a transfer tape coated strip. In this figure a Kovar strip 130 is shown coated with a transferable tape containing glass frit material. In this figure the carrier of the transferable tape is already removed and the glazing tape 131 is firmly adhering to the Kovar strip 130.

Figure 7:
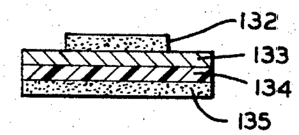
FIGURE 7 is a schematic of the cross section of a metal-plastic laminate coated both sides with resistive transfer tapes.

FIGURE 7 is a schematic of a cross section of a metal-plastic laminate coated both sides with a sensitive transfer tape. The metal 133 and plastic 134 laminate is shown coated on both sides with a resistive transfer tape. It can be seen, that while the transferable tape 132 is coating only the center part of the metal layer 133 of the laminated strip, the plastic side 134 of the laminate is coated entirely with a transferable tape 135. It is obvious that the machine for tape transfer shown in FIGURE 3 is capable of coating two different sizes of transferable tape and applying it to strips or ribbons at any predetermined pattern.

Figure 8:
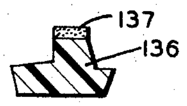
FIGURE 8 is a schematic of the cross section of a plastic strip having an irregular shape coated with a conductive metalizing transfer tape.

FIGURE 8 is a schematic of the cross section of a plastic strip 136 having an irregular shape, coated on one of its surface with a conductive metalizing transfer tape 137.

It is evident from the figures that the machine can also be used for coating flat or irregular shaped strips or ribbons with transferable taper used for glazing or for conductive coating or resistive coating material. It is also evident that strips or ribbons made of metals and non-metals or the composition thereof can also be coated with transferable tapes automatically in a continuous operation.

From the foregoing it will be apparent that novel means and methods have been presented in accordance with the objects of this invention for a process and a machine to perform automatic transfer tape coating of strips and ribbons. It is to be understood, however, that various changes in the means and methods described may be made by those skilled in the art but not departing from the spirit of the invention as expressed in the accompanying claims.

I claim:

1. A strip coating machine, for continuously coating one side surface of a strip of material by transfer to said side surface of coating material from a prefabricated transfer tape of the four-layer type consisting of a first carrier layer, a second transfer coating material containing layer separably carried by said first carrier layer, a third adhesive layer upon the side of said transfer layer opposite its carrier layer engaging side, and a fourth protective layer separably covering said third adhesive layer, comprising:

(A) a strip supply reel means 41 for supporting a roll of said strip material;

(B) strip take-up reel means 38 for drawing and receiving said strip from said strip reel means (a) said strip take-up reel means being spaced from said strip supply reel means, and (b) a span of said strip extending between said strip supply and take-up reel means;

(C) a tape supply reel means 20 for supporting a roll of said four-layer type transfer tape;

(D) a first tape take-up reel means 37 for drawing and receiving said tape from said tape supply reel means;

(E) a second tape take-up reel means 21 for drawing and receiving the fourth protective layer of said four-layer type transfer tape as said tape is drawn from said tape supply reel means, whereby said tape is drawn from said tape supply reel means as a three-layer tape comprising said carrier layer, said transfer layer and said adhesive layer;

(F) guide means 25 for guiding said three-layer tape into juxtaposition to said span of said strip with said third adhesive layer of said tape in engagement with said side surface of said strip to be coated and with said second transfer layer interposed between said carrier layer and said strip;

(G) a pair of opposed spaced pressure rollers 29–30 disposed intermediate said guide means and said strip take-up reel means, one for engagement with said span of said strip and the other for engagement with said carrier layer of said tape, whereby said transfer layer of said tape is pressure bonded through said adhesive layer of said tape to coat said side surface of said strip; and, (H) release means 34 disposed between said pressure rollers and said strip take-up reel means for guiding said carrier layer of said tape away from said coated strip in the transport of said coated strip to said strip take-up reel and of said carrier layer of said tape to said tape take-up reel means.

References Cited

UNITED STATES PATENTS

| | | | |
|---|---|---|---|
| 162,892 | 5/1875 | Braidwood | 156—540 |
| 2,559,649 | 7/1951 | Little et al. | 156—238 |

DOUGLAS J. DRUMMOND, *Primary Examiner.*

U.S. Cl. X.R.

156—555, 584